(12) United States Patent
Griffin et al.

(10) Patent No.: US 11,915,715 B2
(45) Date of Patent: Feb. 27, 2024

(54) NOISE DETECTOR FOR TARGETED APPLICATION OF NOISE REMOVAL

(71) Applicant: Cisco Technology, Inc., San Jose, CA (US)

(72) Inventors: Keith Griffin, County Galway (IE); Svein Gunnar Storebakken Pettersen, Drammen (NO); Torjus Haukom, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 17/357,132

(22) Filed: Jun. 24, 2021

(65) Prior Publication Data

US 2022/0415335 A1 Dec. 29, 2022

(51) Int. Cl.
*G06F 17/00* (2019.01)
*G06F 3/16* (2006.01)
*G10L 21/02* (2013.01)
*H04M 3/56* (2006.01)

(52) U.S. Cl.
CPC .............. *G10L 21/02* (2013.01); *G06F 3/165* (2013.01); *H04M 3/568* (2013.01)

(58) Field of Classification Search
None
See application file for complete search history.

(56) References Cited

U.S. PATENT DOCUMENTS

| | | |
|---|---|---|
| 6,810,273 B1 | 10/2004 | Mattila et al. |
| 7,912,231 B2 | 3/2011 | Yang et al. |
| 2008/0159560 A1 | 7/2008 | Song et al. |
| 2009/0262873 A1 | 10/2009 | Suezawa |
| 2012/0002820 A1 | 1/2012 | Leichter |
| 2018/0012585 A1 | 1/2018 | Qiao |
| 2019/0348032 A1* | 11/2019 | Teng ................... G10L 21/0232 |
| 2020/0043509 A1* | 2/2020 | Chen ...................... G06N 20/00 |
| 2022/0319532 A1* | 10/2022 | Nosrati ............... G10L 21/0208 |

OTHER PUBLICATIONS

Jean-Marc Valin, "RNNoise: Learning Noise Suppression", Mozilla and Xiph, https://jmvalin.ca/demo/rnnoise/, Sep. 27, 2017, 7 pages.
Laurent Oudre, "Automatic Detection and Removal of Impulsive Noise in Audio Signals", Image Processing on Line, https://doi.org/10.5201/ipol.2015.64, Nov. 21, 2015, 15 pages.
Jean-Marc Valin, "A Hybrid DSP/Deep Learning Approach to Real-Time Full-Band Speech Enhancement", 2018 IEEE 20th International Workshop on Multimedia Signal Processing (MMSP), May 2018, 5 pages.

* cited by examiner

*Primary Examiner* — Paul C McCord
(74) *Attorney, Agent, or Firm* — Edell, Shapiro & Finnan, LLC

(57) ABSTRACT

Techniques for performing conditional or controlled noise removal from audio that may contain background noise. The techniques involve obtaining audio from an environment that may have one or more unwanted noise sources, and converting the audio to digital audio data. The digital audio data is analyzed to detect whether there is noise in the audio. When noise is detected in the audio, noise removal is performed on the digital audio data to remove the noise from the audio. When noise is not detected in the audio, the digital audio data is further processed without performing noise removal on the digital audio data.

20 Claims, 7 Drawing Sheets

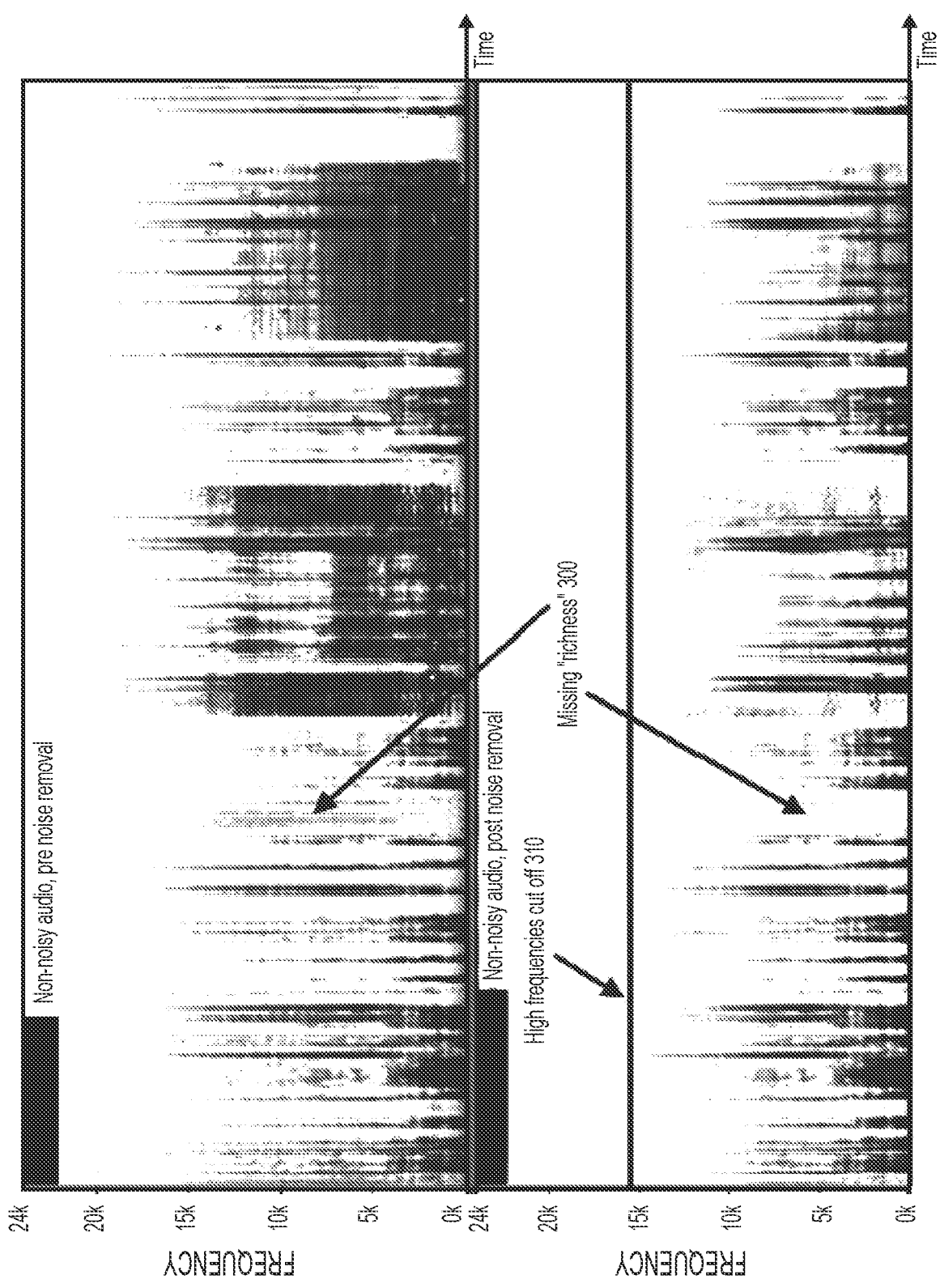

NOISE DETECTOR FOR TARGETED APPLICATION OF NOISE REMOVAL

TECHNICAL FIELD

The present disclosure relates to audio noise reduction.

BACKGROUND

Noise removal solutions for audio applications are used to remove unwanted noise from spoken audio. However, these solutions often leave the resulting speech at a lower quality than the original speech sample.

BRIEF DESCRIPTION OF THE DRAWINGS

FIG. 3A is a screen shot of a signal analyzer display of non-noisy audio prior to processing by noise removal techniques.

FIG. 3B is a screen shot of a signal analyzer display of the non-noisy audio after noise removal is applied, and showing the degradation of the audio.

DESCRIPTION OF EXAMPLE EMBODIMENTS

Overview

Presented herein are techniques for performing conditional or controlled noise removal from audio that may contain background noise. The techniques involve obtaining audio from an environment that may have one or more unwanted noise sources, and converting the audio to digital audio data. The digital audio data is analyzed to detect whether there is noise in the audio. When noise is detected in the audio, noise removal is performed on the digital audio data to remove the noise from the audio. When noise is not detected in the audio, the digital audio data is further processed without performing noise removal on the digital audio data.

Example Embodiments

Presented herein is a system and method to tactically deploy noise removal only when needed in order to optimize quality of resulting speech experience. The techniques involve a single noise detector (to determine whether there is noise, or not,) in order to apply noise removal, as opposed to suppression of specific noises.

Some basic definitions are provided.

"Noise Detection" involves detecting unwanted noise in audio.

"Noise Removal" involves removing unwanted noise in audio.

Conventionally, noise removal runs "always on" and a noise detector may be used to identify specific noises at run-time. Noise removal solutions can often result in an output that successfully removes unwanted noise but also leaves the voice audio distorted. In environments where there is not much noise, such noise removal can do more harm than good. This is undesirable especially in high-end, high quality video conference/collaboration systems.

Figure 1:
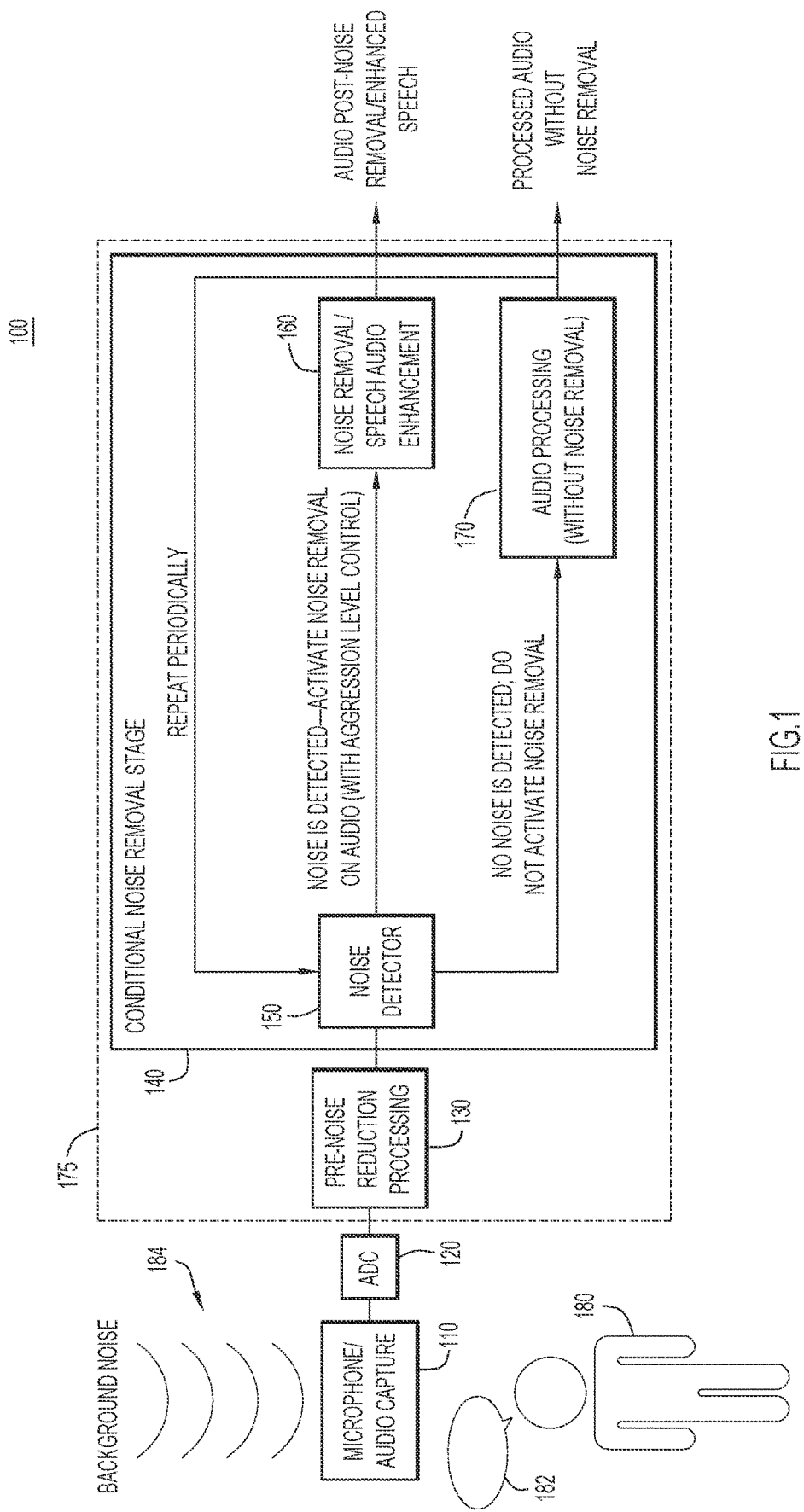
FIG. 1 is a block diagram of an audio processing system having a conditional noise removal stage, according to an example embodiment.

Reference is now made to FIG. 1. FIG. 1 shows a block diagram of an audio processing system 100. The audio processing system 100 may be used in any device or environment where it is desirable to remove noise from audio, such as speech audio. The audio processing system 100 includes a microphone 110 or other audio capture device, an analog-to-digital converter (ADC) 120 (or several ADCs), a pre-noise reduction processing stage 130, and a conditional noise removal stage 140. The conditional noise removal stage 140 includes a noise detector 150, a noise removal/speech audio enhancement stage 160 and an audio processing (without noise removal) stage 170. As shown by the dotted box 175, the pre-noise reduction processing stage 130 and the conditional noise removal stage 140 may be implemented by digital logic in one or more integrated circuits or in software executed by a processor.

The audio processing system may be deployed in telephone (desktop or mobile), voice conference endpoint, meeting client application running on a host device, such as a laptop computer, desktop computer, tablet computer, smartphone (in which case the microphone 110 is integrated to the host device or a separate peripheral, and ADC 120 is part of the functionality of the host device).

In operation, the microphone 110 or other audio capture component captures audio that includes speech audio 180 from a person 182 as well as background noise 184 associated with one or more background noise sources in the vicinity of the microphone 110. The ADC 120 samples the audio and converts the audio to digital audio data. The digital audio data will include digital representation of a combination of the speech audio 180 and the background noise 184. The pre-noise reduction processing stage 130 performs various processing operations of the digital audio data.

Next, the noise detector 150 analyzes the digital audio data (derived from the audio captured by the microphone 110) to determine presence of noise in the digital audio data. In other words, the noise detector 150 analyzes digital audio data derived from audio captured in an environment that may have one or more unwanted noise sources, to detect whether there is noise in the audio. For example, the noise detector 150 performs low latency noise detection (low single digit milliseconds) to determine whether the digital audio data contains background noise. The noise detector 150 may employ one or more machine learning (ML) models to analyze the digital audio data in order to determine whether there is noise present in the digital audio data.

The techniques presented herein are quite different from noise reduction techniques employed in other environments, such as for "line noise" in telephony systems, where such noise is known noise arranged by frequency bins. The noise detector 150 is configured to detect a different domain of noises that includes "nonhuman" common household, office or remote working noises that people typically encounter during meetings and calls, such as garden equipment, keyboard noise, paper rustling (eating), sirens etc. These noises involve specific detection handling that cannot be addressed using frequency-bin based analysis. The noise detector 150 uses one or more ML-based models which match patterns of noises relative to voice to determine if certain types of noise (examples of which are listed above) is present or not. The noise removal stage 160 may perform ML-based noise reduction based on mixed trained noise reduction models in which multiple known noises are combined in order to recognize noise and differentiate those known noises from speech.

The noise detector 150 may be trained on a range of noises which are singular or combinations of noises. A primary focus is enhanced speech so anything other than speech is tested against trained noise models to determine if it warrants removal (or activation of noise removal).

Noise reduction techniques that have been applied in the telephony field involve the use of time and frequency-bin analysis, whereas the machine learning techniques used in both noise detection and noise removal are much more robust and can be readily tuned for speech audio enhancement that is often useful in online meetings and other more recent audio applications.

When the noise detector 150 detects the presence of noise (background noise) in the digital audio data, the noise detector 150 activates the noise removal/speech audio enhancement stage 160 to process the digital audio data (passed through by the noise detector 150) to remove (suppress) the noise so as to improve/enhancement the intelligibility of speech audio in the digital audio data. The noise removal/speech audio enhancement stage 160 may perform one or more speech audio enhancement algorithms that remove noise and enhance speech in the presence of noise. One example of a noise removal algorithm/process that may be used in the noise removal/speech audio enhancement stage 160 is the RNNoise algorithm described at https://jmvalin.ca/demo/rnnoise/.

When the noise detector 150 does not detect noise in the digital audio data, the noise detector 150 does not activate noise removal/speech audio enhancement stage 160 and instead directs the digital audio data to audio processing stage 170 where the digital audio data is further processed (without noise removal). The output of the audio processing stage 170 is digital data representing processed audio without noise removal.

Thus, the noise detector 150 continues to monitor the digital audio data. When the noise detector 150 does not detect, or no longer detects, noise in the digital audio data for a period of time (seconds), the noise detector 150 disables noise removal/speech audio enhancement stage 160, thereby saving computing resources associated with operation of the noise removal/speech audio enhancement stage 160.

Generally, it may be desirable to avoid running the noise removal/speech audio enhancement stage 160 all the time, and rather enable/activate noise removal based on the output from the noise detector 150. Again, the noise detector 150 is trained to detect bothersome noises, including keyboard click noises. The noise detector 150 may use a detection model that detects for a combination of known noises in the context of speech. A threshold may be used to determine when noise removal should be applied based on the level of removal/reduction that can be achieved relative to the level of distortion that might be expected in the processed audio.

The audio processing system depicted in FIG. 1 may be configured to adjust the 'aggression' level of noise removal based on the level of detected noise. The noise detector 150 would not just detect noise but classify the level of noise. If the noise detector 150 determines the noise level to be high (e.g., relative to a first noise level threshold), the noise detector 150 may provide an aggression level control to the noise removal stage 160 (as noted in FIG. 1) to cause the noise removal stage to apply a more aggressive level of noise removal. Conversely, if the noise detector 150 determines the noise level to be low (relative to the first noise level threshold or a second noise level threshold), then the noise detector 150 may provide an aggression level control to the noise removal stage 160 to cause the noise removal stage 160 to apply more moderate noise removal. The aggression level of noise removal may be controlled in smooth or continuous manner relative to the level of detected noise. Further still, if the noise detector 150 detects the noise to be below the second noise level threshold (or below a third noise level threshold), then no noise removal is applied.

To summarize, the audio processing system 100 involves using noise detection as a precursor to activating the noise removal to a given audio sample. When noise is detected the noise removal stage is activated, otherwise noise removal is disabled.

Figure 2A:
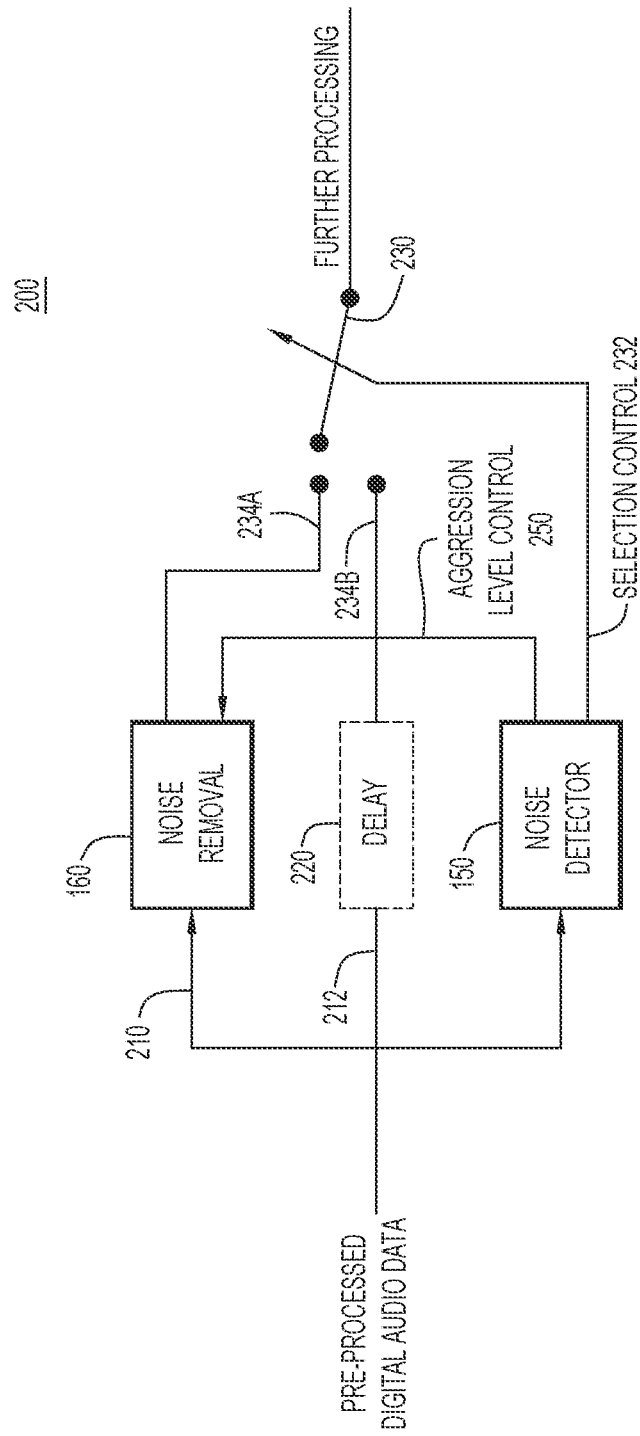
FIG. 2A is a block diagram of an audio processing system having two parallel signal processing paths from which a selection is path for further processing, according to an example embodiment.

Reference is now made to FIG. 2A. FIG. 2A shows part of the components of the audio processing system 100 of FIG. 1, with some variations from the configuration shown in FIG. 1. Specifically, FIG. 2A shows a portion of audio processing system 200 in which there are two (perhaps constantly operating) parallel signal processing paths. In a first signal processing path 210, the noise removal stage 160 is operating and noise removal is being performed, while in a second signal processing path 212, the digital audio data is unprocessed, but may optionally be delayed by a delay operation 220 in order to match the same delay as introduced by the noise removal stage 160. There is a logical switch element/function 230 that is controlled by the noise detector 150. The noise detector 150 generates a selection control 232 that controls the switch element/function 230 to switch between two outputs 234A and 234B based on whether the noise detector 150 detects the presence of noise in the digital audio data. Output 234A is the output of the noise removal stage 160 and output 234B is the output of the second signal processing path 212 (with the optional delay operation 220). Thus, the noise detector 150 selects output 234A when the noise detector 150 detects noise, and otherwise, when it does not detector noise, it selects the output 234B.

Figure 2B:
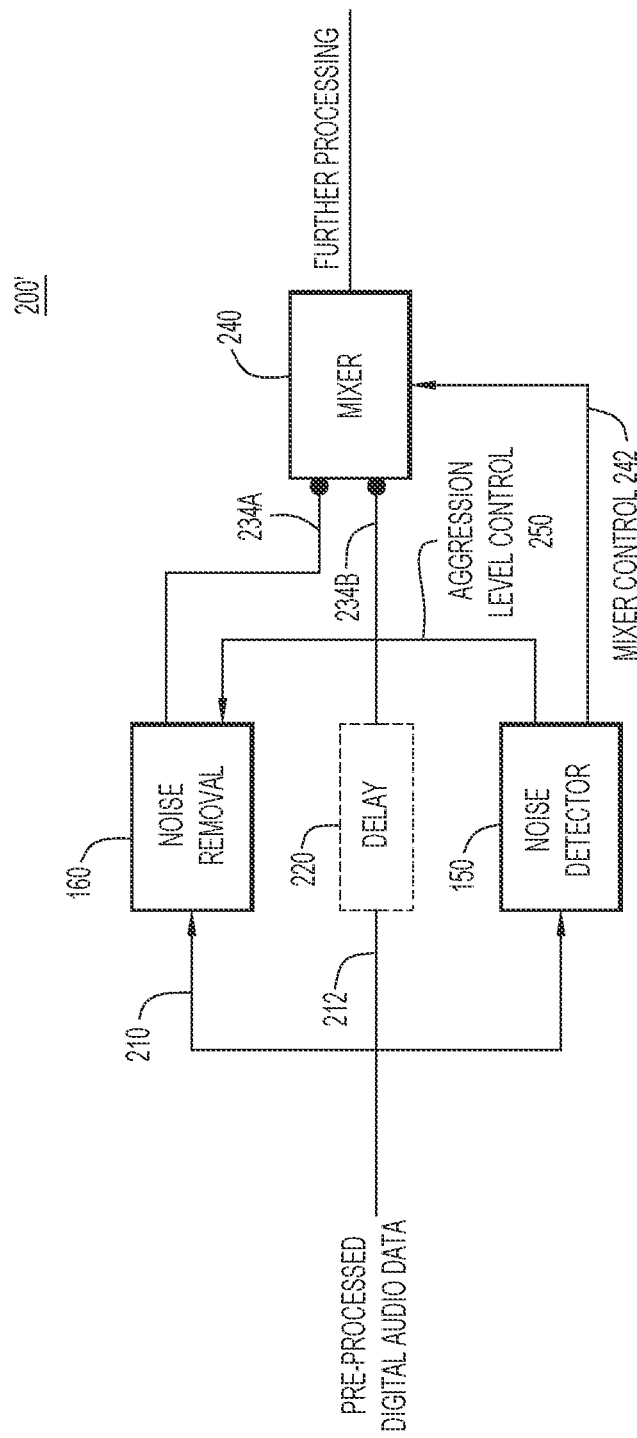
FIG. 2B is a block diagram of an audio processing system having two parallel signal processing paths that outputs from which are mixed according to a confidence level of noise detection, according an example embodiment.

FIG. 2B shows audio processing system 200' according to another variation. The audio processing system 200' is an extension of the audio processing system 200 of FIG. 2A, where the outputs of the two signal processing paths 210 and 212 are mixed proportionally to a noise detection confidence of the noise detector 150, especially during transitions. To this end, the audio processing system 200' includes a mixer 240 that mixes the outputs 234A and 234B from the first and second signal processing paths 210 and 212. The noise detector 150 generates a mixer control 242 that is supplied to the mixer 240. The mixer control 242 is based on a confidence level that the noise detector 150 generates in detecting noise in the digital audio data. The mixer control 242 causes the mixer 240 to include more of the processed digital audio data on output 234A (from the noise removal stage 160) than the unprocessed digital audio data on output 234B, when the noise detector 150 has a higher confidence of detecting presence of noise in the digital audio data.

Conversely, the mixer control 242 causes the mixer 240 to include more of the unprocessed digital audio data on output 234B than the processed digital audio data on output 234A when the noise detector has a lower confidence of noise detection. How much of the processed digital audio data on output 234A and of the unprocessed digital audio data on output 234B is included in the mix may be determined in proportion to the noise detection confidence level. This may not be a "hard" decision, but rather a weighted mix, where the weighting is determined based on the noise detection confidence level. At one extreme, when a noise detection confidence of the noise detector 150 is greater than a predetermined threshold, the mixer control 242 may be such that only the output 234A from the noise removal stage 160 is selected for output by the mixer 240. Similarly, at the other extreme, when a noise detection confidence of the noise detector 150 is less than a predetermined threshold, the mixer control 242 may be such that only the output 234B containing unprocessed digital audio data is selected for output by the mixer 240.

One advantage of the audio processing system variations depicted in FIGS. 2A and 2B is that they prevent the noise removal stage 160 from failing to compensate at the beginning of noise due to the fact that the noise detector 150 may need a short amount of time to actually detect when noise starts.

The audio processing systems depicted in FIGS. 2A and 2B may be configured to adjust the 'aggression' level of noise removal based on the level of detected noise, similar to that described above in connection with FIG. 1. The noise detector 150 would not just detect noise but classify the level of noise. FIGS. 2A and 2B show the aggression level control 250 that the noise detector 150 provides to the noise removal stage 160

Reference is made to FIGS. 3A and 3B. FIGS. 3A and 3B are screen shots of a signal analyzer display of plots of frequency versus time of audio that includes little or no noise. FIG. 3A shows an example of a frequency versus time plot of audio with low or no noise, prior to being subjected to a noise removal processing. FIG. 3B shows an example of a frequency versus time plot of the same audio of FIG. 3A, but after noise removal processing is performed. As shown at 300, noise removal processing of audio having little or no noise can have the effect of removing some of the audio. Moreover, as shown at 310, high frequency content of the audio can be removed, which reduces the quality of the audio.

Accordingly, to overcome the issues presented in FIGS. 3A and 3B, in the embodiments of FIGS. 1, 2A and 2B, the noise detector 150 may determine the level of noise relative to the level of speech in the digital audio data. The noise detector 150 may use this determination (noise level relative to speech level) to control the noise removal stage 160 to dynamically adjust the noise removal level that is best suited to enhance speech, and thus maintain desirable speech quality. This could involve a choice between different noise removal algorithms trained to have different levels of aggressiveness, or alternatively to adjust noise removal algorithm parameters in order to adjust the aggressiveness. The desired effect is to maintain as much audio richness as possible. The result will be that the post-noise removal audio will maintain better aspects of the original audio, such as higher frequencies and richness.

In summary, techniques are provided for selectively deploying or controlling noise removal techniques in order to improve the resulting speech quality.

Figure 4:
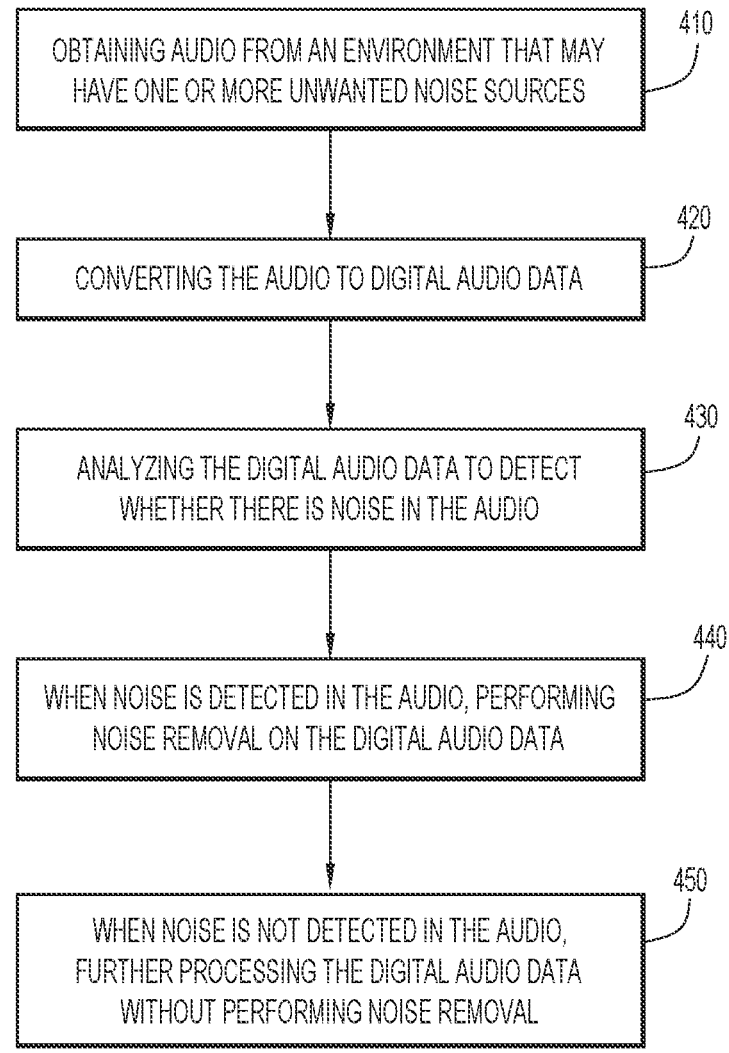
FIG. 4 is a flow chart of a method for audio processing according to an example embodiment.

Turning to FIG. 4, a flow chart of a method 400 of processing audio is now described, according to an example embodiment. The method 400 includes, at step 410, obtaining audio from an environment that may have one or more unwanted noise sources. The obtaining may involve detecting audio from a microphone during a teleconference or telephone call.

At step 420, the audio is converted to digital audio data, e.g., by one or more ADCs. At step 430, the method 400 includes analyzing the digital audio data to detect whether there is noise in the audio. At step 440, the method includes, when noise is detected in the audio, performing noise removal on the digital audio data to remove the noise from the audio. At step 450, the method includes, when noise is not detected in the audio, further processing the digital audio data without performing noise removal on the digital audio data.

As described above, the operation of analyzing the digital audio data may involve applying one or more machine learning models to the digital audio data, the one or more machine learning models having been trained to detect noise associated with the one or more unwanted noise sources. The operation of performing noise removal may involve performing one or more speech enhancement algorithms that remove noise and enhance speech in the presence of noise.

Further, as described above, the operation of analyzing may involve detecting a level of the noise relative to a level of speech in the audio, and the method 400 may further include dynamically adjusting the noise removal to maintain speech quality.

Further still, as described above in connection with FIG. 2A, the operation of performing noise removal results in processed digital audio data, and the method 400 may further include: providing unprocessed digital audio data without noise removal; and based on the operation of analyzing, selecting for further processing either the processed digital audio data or the unprocessed digital audio data.

As described above in connection with FIG. 2B, the operation of performing noise removal results in processed digital audio data, and the method 400 may further include: providing unprocessed digital audio data without noise removal; and based on the operation of analyzing, mixing, based on a noise detection confidence level, the processed digital audio data with the unprocessed digital audio data.

Figure 5:
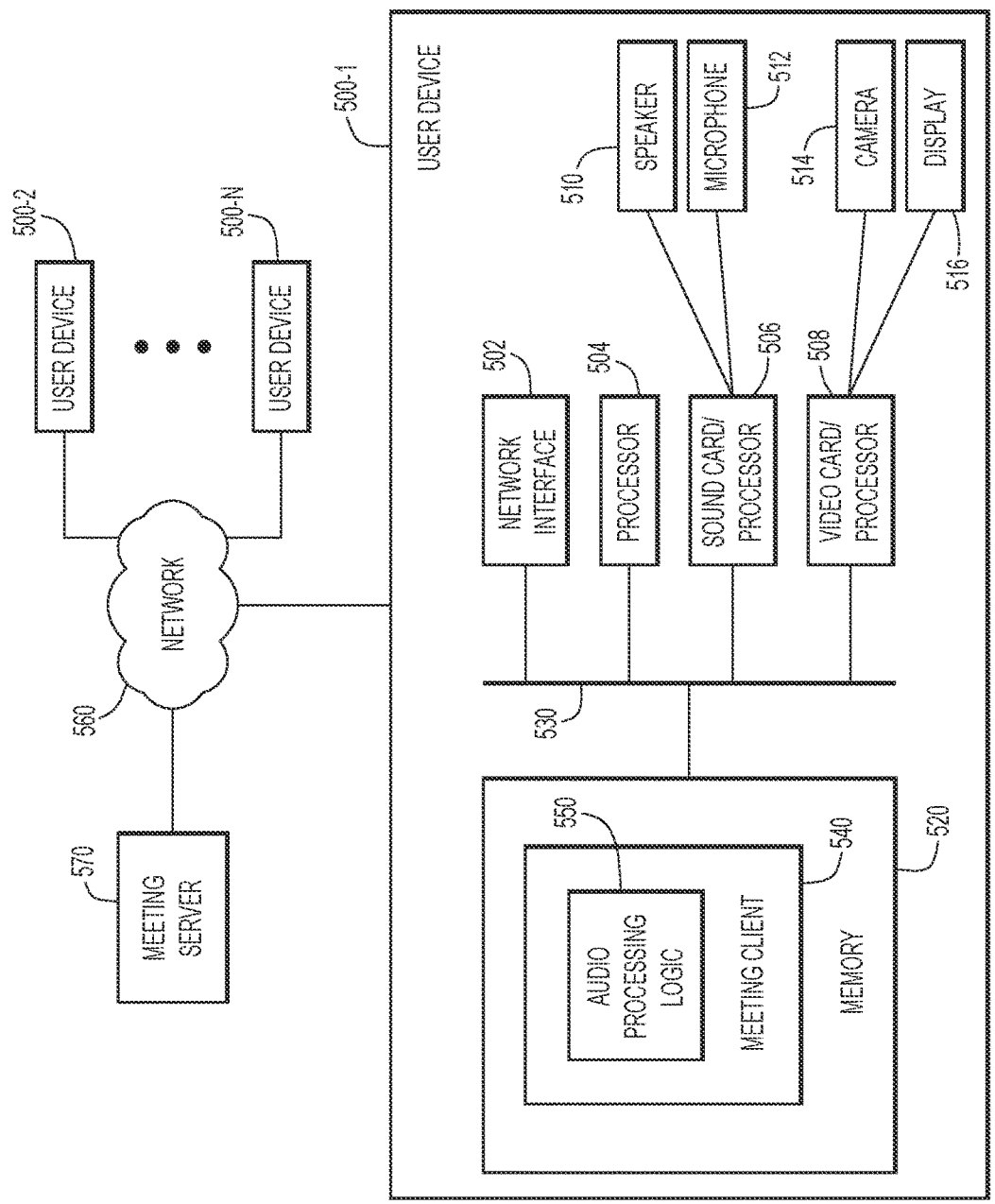
FIG. 5 is a system block diagram showing an example arrangement of a user device configured to employ the audio processing techniques presented herein, according to an example embodiment.

As depicted in FIG. 5 (described below), the operations of converting, analyzing, performing noise removal and further processing are performed at a user device that is participating in the teleconference, and prior to sending an outgoing audio signal from the user device into the teleconference. Furthermore, the operations of analyzing, performing noise removal and further processing may be performed by a meeting client running on the user device.

Further still, the operation of performing noise removal may result in processed digital audio data, and the method 400 may further comprise: providing unprocessed digital audio data without noise removal; and based on the analyzing: selecting for further processing either the processed digital audio data or the unprocessed digital audio data; or mixing, based on a noise detection confidence level, the processed digital audio data with the unprocessed digital audio data.

Turning now to FIG. 5, a block diagram is shown of a user device that may be configured to employ the audio processing techniques presented herein. Moreover, FIG. 5 shows the user device as part of a collaboration system that includes a meeting server and a plurality of other user devices. A user device 500-1 includes a network interface 502 (e.g., one or more wired or wireless network interface cards), a processor 504 (e.g., a microprocessor or microcontroller), a sound card/processor 506, a video card/processor 508, a microphone 510, a speaker 512, a camera 514 and a display 516, a memory 520 and a bus 530. The network interface 502, processor 504, sound card/processor 506, and video card/processor 508 may be connected to the bus 530. Likewise, the memory 520 may be connected to the bus 530.

The user devices 500-1-500-N may take on a variety of forms, including, without limitation, be a desktop computer, a laptop computer, a tablet computer, a smartphone, a video conference endpoint, a digital telephone, a wireless telephone base station, or any other device now known or hereinafter developed that captures, or otherwise obtains audio (in a teleconference, video conference, etc.) from an environment that may include background noise to be removed prior to playing the audio either locally or sending the signals (analog or digital data) representing the audio to a destination for playing the audio or re-transmitting the audio to still other destinations.

In some forms, the network interface 502 may be include telephony interface that enables user device to conduct telephone calls over a Public Standard Telephone Network (PSTN) or a digital telephony interface, in the case where the user device is a telephone or digital telephone. Thus, the network interface 502 may be considered, more generally, as a communication interface.

The memory 520 may store software instructions, that when executed by the processor 504, cause the processor 504 to perform operations on behalf of the user device 500-1. For example, the memory 520 may store instructions for a meeting (collaboration) client 540 that enables the user device 500-1 to participate in an online meeting session. The meeting client 540 may include software instructions for audio processing logic 550 that, when executed by the processor 504, cause the processor to perform the audio processing operations described in connection with FIGS. 1, 2A, 2B, 3 and 4, on behalf of the user device 500-1.

The user device 500-1 has connectivity, via the network interface 502, to network 560 (e.g., a local area network, a wide area network or any combination thereof). A meeting (collaboration) server 570 also has connectivity to the network 560 to connect to the user device 500-1 as well as to one or more other similarly configured user devices 500-2-500-N. The meeting server 570 is configured to establish and maintain a meeting sessions with two or more of the user devices 500-1-500-N.

The audio processing logic 550 of the meeting client 540 enables the user device 500-1 to send to meeting server 570 digital audio data (as well as video, if so desired) that has been processed to remove any noise, when noise is detected in the audio. As a result, users of user devices 500-2-500-N that receive digital audio data from user device 500-1 in in order to listen to audio from a user of user device 500-1 with minimal to no background noise associated with the environment of user device 500-1.

Figure 6:
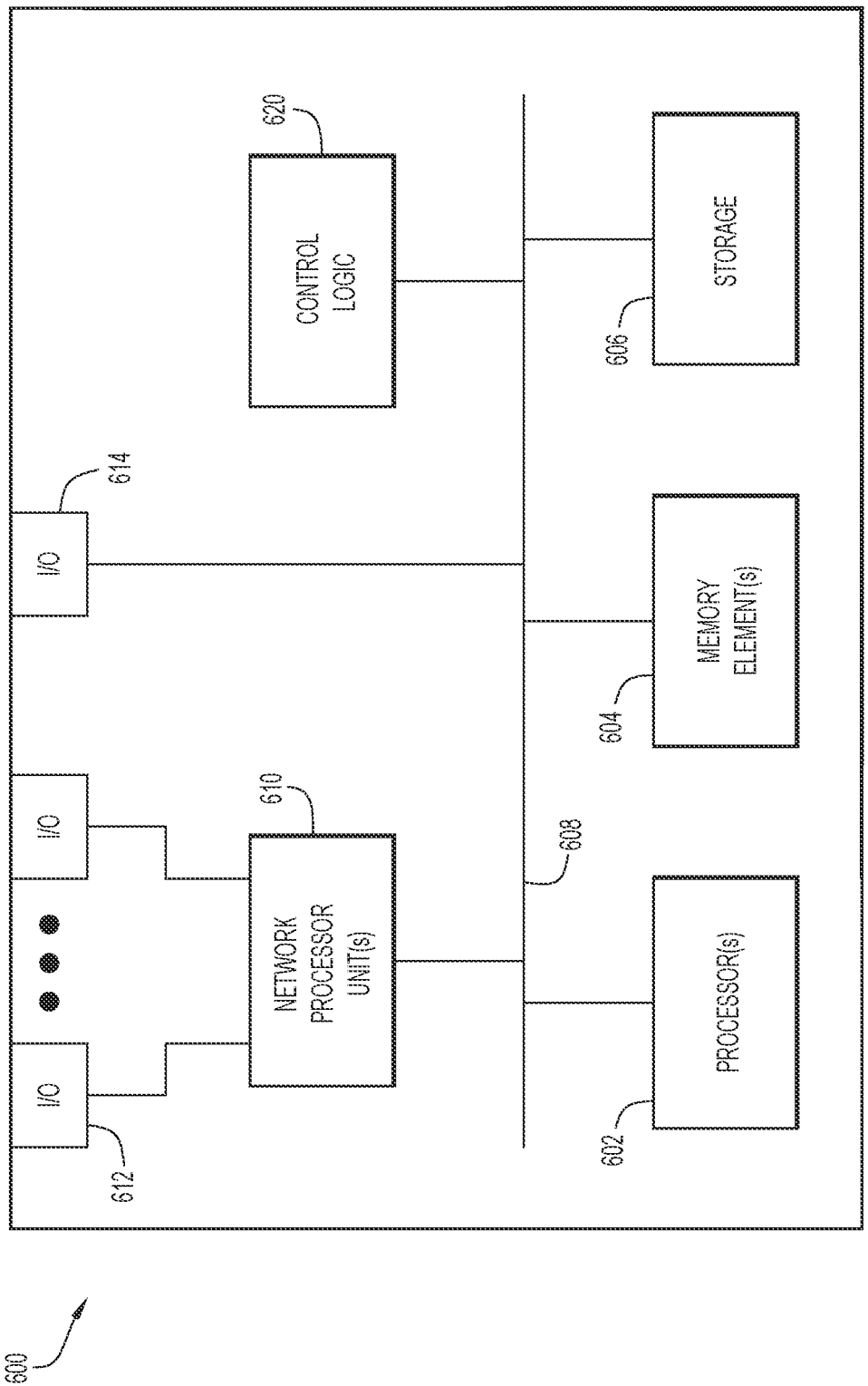
FIG. 6 is a hardware block diagram of a computer device that may be configured to perform the functions of a server configured to perform the audio processing techniques presented herein, according to an example embodiment.

Referring to FIG. 6, FIG. 6 illustrates a hardware block diagram of a computing/computer device 600 that may perform the audio processing operations at the meeting server 570 shown in FIG. 5, or other server apparatus.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein. The control logic 620 may include instructions for to perform the operations of the audio processing techniques based on audio obtained from a user device.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Thus, in one form, a method is provided comprising: obtaining audio from an environment that may have one or more unwanted noise sources; converting the audio to digital audio data; analyzing the digital audio data to detect whether there is noise in the audio; when noise is detected in the audio, performing noise removal on the digital audio data to remove the noise from the audio; and when noise is not detected in the audio, further processing the digital audio data without performing noise removal on the digital audio data.

In another form, an apparatus is provided comprising: a microphone configured to capture audio from an environment that may have one or more unwanted noise sources; a processor; and a memory coupled to the processor, wherein the memory stores instructions that, when executed by the processor, cause the processor to perform operations including: analyzing digital audio data derived from the audio captured by the microphone, to detect whether there is noise in the audio; when noise is detected in the audio, performing noise removal on the digital audio data to remove the noise from the audio; and when noise is not detected in the audio, further processing the digital audio data without performing noise removal on the digital audio data.

In another form, one or more non-transitory computer readable storage media are provided encoded with instructions that, when executed by a processor, cause the processor to perform operations including: analyzing digital audio data derived from audio captured in an environment that may have one or more unwanted noise sources, to detect whether there is noise in the audio; when noise is detected in the audio, performing noise removal on the digital audio data to remove the noise from the audio; and when noise is not detected in the audio, further processing the digital audio data without performing noise removal on the digital audio data.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining audio from an environment that may have one or more unwanted noise sources;
   converting the audio to digital audio data;
   analyzing, by a noise detector, the digital audio data to determine whether noise is detected in the audio;
   determining, by the noise detector, that noise is detected in the audio;
   generating, by the noise detector, a confidence level when detecting noise in the audio;

generating, by the noise detector, a mixer control based on the confidence level;
performing noise removal on the digital audio data to remove the noise from the audio to produce first processed digital audio data based on determining that noise is detected in the audio;
determining, by the noise detector, that noise is not detected in the audio;
processing the digital audio data without performing noise removal on the digital audio data to produce second processed digital audio data based on determining that noise is not detected in the audio; and
mixing the first processed digital audio data and the second processed digital audio data based on the mixer control to produce mixed audio data, wherein an amount of the first processed digital audio data in the mixed audio data is determined based on the confidence level.

2. The method of claim 1, wherein analyzing the digital audio data comprises applying one or more machine learning models to the digital audio data, the one or more machine learning models having been trained to detect noise associated with the one or more unwanted noise sources.

3. The method of claim 1, wherein performing noise removal on the digital audio data comprises performing one or more speech audio enhancement algorithms that remove noise and enhance speech in a presence of noise.

4. The method of claim 1, wherein analyzing further comprises detecting a level of the noise detected in the audio, and further comprising:
controlling an aggression level of the noise removal based on the level of the noise detected in the audio.

5. The method of claim 1, wherein analyzing further comprises detecting a level of the noise relative to a level of speech in the audio, and further comprising:
dynamically adjusting the noise removal to maintain speech quality.

6. The method of claim 1, further comprising:
based on analyzing, selecting for further processing either the first processed digital audio data or the second processed digital audio data.

7. The method of claim 1, wherein obtaining the audio comprises detecting audio from a microphone during a teleconference or telephone call.

8. The method of claim 7, wherein converting, analyzing, performing noise removal and further processing are performed at a user device that is participating in the teleconference, and prior to sending an outgoing audio signal from the user device into the teleconference.

9. The method of claim 8, wherein analyzing, performing noise removal and further processing are performed by a meeting client running on the user device.

10. An apparatus comprising:
a microphone configured to capture audio from an environment that may have one or more unwanted noise sources;
a processor; and
a memory coupled to the processor, wherein the memory stores instructions that, when executed by the processor, cause the processor to perform operations including:
analyzing digital audio data derived from the audio captured by the microphone, to detect whether there is noise in the audio;
generating a confidence level when detecting whether there is noise in the audio;
generating a mixer control based on the confidence level;
when noise is detected in the audio, performing noise removal on the digital audio data to remove the noise from the audio to produce first processed digital audio data;
when noise is not detected in the audio, further processing the digital audio data without performing noise removal on the digital audio data to produce second processed digital audio data; and
mixing the first processed digital audio data and the second processed digital audio data based on the mixer control to produce mixed audio data, wherein an amount of the first processed digital audio data in the mixed audio data is determined based on the confidence level.

11. The apparatus of claim 10, wherein analyzing of the digital audio data comprises applying one or more machine learning models to the digital audio data, the one or more machine learning models having been trained to detect noise associated with the one or more unwanted noise sources.

12. The apparatus of claim 10, wherein analyzing further comprises detecting a level of the noise detected in the audio, and wherein the operations further comprise:
controlling an aggression level of the noise removal based on the level of the noise detected in the audio.

13. The apparatus of claim 10, wherein analyzing further comprises detecting a level of the noise relative to a level of speech in the audio, and wherein the operations further comprise:
dynamically adjusting the noise removal to maintain speech quality.

14. The apparatus of claim 10, wherein the operations further comprise:
based on analyzing, selecting for further processing either the first processed digital audio data or the second processed digital audio data.

15. One or more non-transitory computer readable storage media encoded with instructions that, when executed by a processor, cause the processor to perform operations including:
analyzing digital audio data derived from audio captured in an environment that may have one or more unwanted noise sources, to detect whether there is noise in the audio;
generating a confidence level when detecting whether there is noise in the audio;
generating a mixer control based on the confidence level;
when noise is detected in the audio, performing noise removal on the digital audio data to remove the noise from the audio to produce first processed digital audio data;
when noise is not detected in the audio, further processing the digital audio data without performing noise removal on the digital audio data to produce second processed digital audio data; and
mixing the first processed digital audio data and the second processed digital audio data based on the mixer control to produce mixed audio data, wherein an amount of the first processed digital audio data in the mixed audio data is determined based on the confidence level.

16. The one or more non-transitory computer readable storage media of claim 15, wherein analyzing the digital audio data comprises applying one or more machine learning models to the digital audio data, the one or more machine learning models having been trained to detect noise associated with the one or more unwanted noise sources, and performing noise removal on the digital audio data comprises performing one or more speech audio enhancement algorithms that remove noise and enhance speech in a presence of noise.

17. The one or more non-transitory computer readable storage media of claim 15, wherein analyzing comprises detecting a level of the noise relative to a level of speech in the audio, and the operations further include dynamically adjusting the noise removal to maintain speech quality.

18. The one or more non-transitory computer readable storage media of claim 15, further comprising instructions that cause the processor to perform operations including:
   based on analyzing, selecting for further processing either the first processed digital audio data or the second processed digital audio data.

19. The apparatus of claim 10, wherein the audio is captured by the microphone during a teleconference or telephone call.

20. The one or more non-transitory computer readable storage media of claim 15, wherein the audio is captured by a microphone during a teleconference or telephone call.

\* \* \* \* \*